(12) United States Patent
Bitsche et al.

(10) Patent No.: US 6,380,638 B1
(45) Date of Patent: Apr. 30, 2002

(54) HYBRID PROPULSION FOR FUEL-CELL CARS

(75) Inventors: Omar Bitsche; Dirk Spaniel, both of Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/623,930

(22) PCT Filed: Feb. 10, 1999

(86) PCT No.: PCT/EP99/00879

§ 371 Date: Nov. 16, 2000

§ 102(e) Date: Nov. 16, 2000

(87) PCT Pub. No.: WO99/46140

PCT Pub. Date: Sep. 16, 1999

(30) Foreign Application Priority Data

Mar. 11, 1998 (DE) .......................................... 198 10 467

(51) Int. Cl.$^7$ ................................................. H02P 9/04
(52) U.S. Cl. ........................ 290/40 C; 320/147; 320/5; 290/1 R; 322/16
(58) Field of Search ................................ 290/1 R, 40 A, 290/40 C; 320/5, 147; 322/16, 22; 307/10.1

(56) References Cited

U.S. PATENT DOCUMENTS

| 5,166,584 | A | | 11/1992 | Fukino et al. ............... 318/139 |
| 5,519,312 | A | | 5/1996 | Wang et al. ................. 323/360 |
| 5,532,573 | A | * | 7/1996 | Brown et al. .................. 322/22 |
| 5,631,532 | A | * | 5/1997 | Azuma et al. ................. 320/5 |
| 5,760,488 | A | * | 6/1998 | Sonntag ....................... 307/10.1 |
| 5,767,584 | A | * | 6/1998 | Gore et al. ................. 290/1 R |
| 2001/0001051 | A1 | * | 5/2001 | Cratty ........................... 429/12 |
| 2001/0035740 | A1 | * | 11/2001 | Palanisamy ................. 320/147 |

FOREIGN PATENT DOCUMENTS

| EP | 0136187 | 4/1985 |
| JP | 09231991 | 5/1997 |

* cited by examiner

Primary Examiner—Nicholas Ponomarenko
(74) Attorney, Agent, or Firm—Crowell & Moring LLP

(57) ABSTRACT

The invention relates to a hybrid drive for an electric vehicle having a fuel cell, an energy store, an electric traction motor and electrical auxiliary loads. The invention proposes providing two separate circuits, provided with switching devices, for selectively connecting the electric traction motor and the electrical auxiliary loads to the fuel cell or to the energy store, and providing a switchable connecting line between the fuel cell and the energy store.

22 Claims, 2 Drawing Sheets

HYBRID PROPULSION FOR FUEL-CELL CARS

TECHNICAL FIELD

The invention relates to a hybrid drive for an electric vehicle having a fuel cell and an energy store.

DISCUSSION

U.S. Pat. No. 5,334,463 A1 discloses a hybrid drive, comprising a fuel cell, a battery, an electric traction motor and electrical auxiliary loads, the fuel cell and the battery being connected in series with the electric traction motor and the electrical auxiliary loads by means of a common circuit, With sufficient voltage, the battery can be charged by the fuel cell.

Such an arrangement having only one circuit has the disadvantage that the larger of the two voltage sources, that is to say fuel cell or battery, determines the maximum driving power, since it is not possible to connect two current sources having different voltages to one load. This means that, at full load, the electric traction motor is supplied by the fuel cell or by the battery, depending on which of the two voltage sources provides greater power.

In addition, U.S. Pat. No. 5,519,312 A1 discloses a hybrid system, comprising a fuel cell and a superconductive magnetic store (SMES) which are connected to an electrical load by means of a converter. Suitable switches and a control unit can be used to connect the fuel cell to the SMES store and to connect the fuel cell and/or the SMES store to the electrical load.

A further hybrid system, comprising a fuel cell and two batteries connected in parallel therewith, is disclosed in EP 0 136 187 A2. Suitable switches can be used to isolate and connect the fuel cell and the batteries from/to the circuit.

Finally, U.S. Pat. No. 5,166,584 A1 discloses an electric vehicle having a hybrid system which comprises a battery and an electrical generator and in which, in overload mode, the current supply for auxiliary loads is reduced in order to ensure sufficient current supply for the traction drive.

SUMMARY OF THE INVENTION

It is the object of the invention to provide a hybrid drive for electric vehicles having improved driving powers.

The object is achieved by the characterizing features of Patent claim 1.

The hybrid drive according to the invention has the advantage that it permits variable control, which, in particular, improves the maximum driving power. In the first illustrative embodiment, the auxiliary loads can be supplied by the energy store at full load. This means that the maximum fuel cell power is available for driving the vehicle. In all the other illustrative embodiments, the electric traction motor can be driven by the fuel cell and the energy store at full load, which means that the maximum driving power is given as the sum of fuel cell and energy store power.

In addition, in braking mode, the electrical auxiliary loads can be supplied by the fuel cell, which means that the energy store can also be charged at low brake powers, that is to say even below the power requirement of the electrical auxiliary loads.

The use of a DC/DC converter in the connecting line between the two circuits also allows the energy store to be charged when the vehicle is at a standstill, irrespective of the voltage or the load state of the fuel cell. In addition, the energy store can also be charged and discharged while the vehicle is in motion, irrespective of the voltage or the load state of the fuel cell. Nevertheless, undesirable losses through the DC/DC converter arise only when the energy store is being charged or when the electric traction motor is being operated by the energy store. Since the fuel cell is connected to the electric traction motor without the interposition of a DC/DC converter, no such losses arise when the electric traction motor is being operated by the fuel cell.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

The drawings, which form an integral part of the specification, are to be read in conjunction therewith, and like reference numerals are employed to designate identical components in various views.

DETAILED DESCRIPTION

Figure 1:
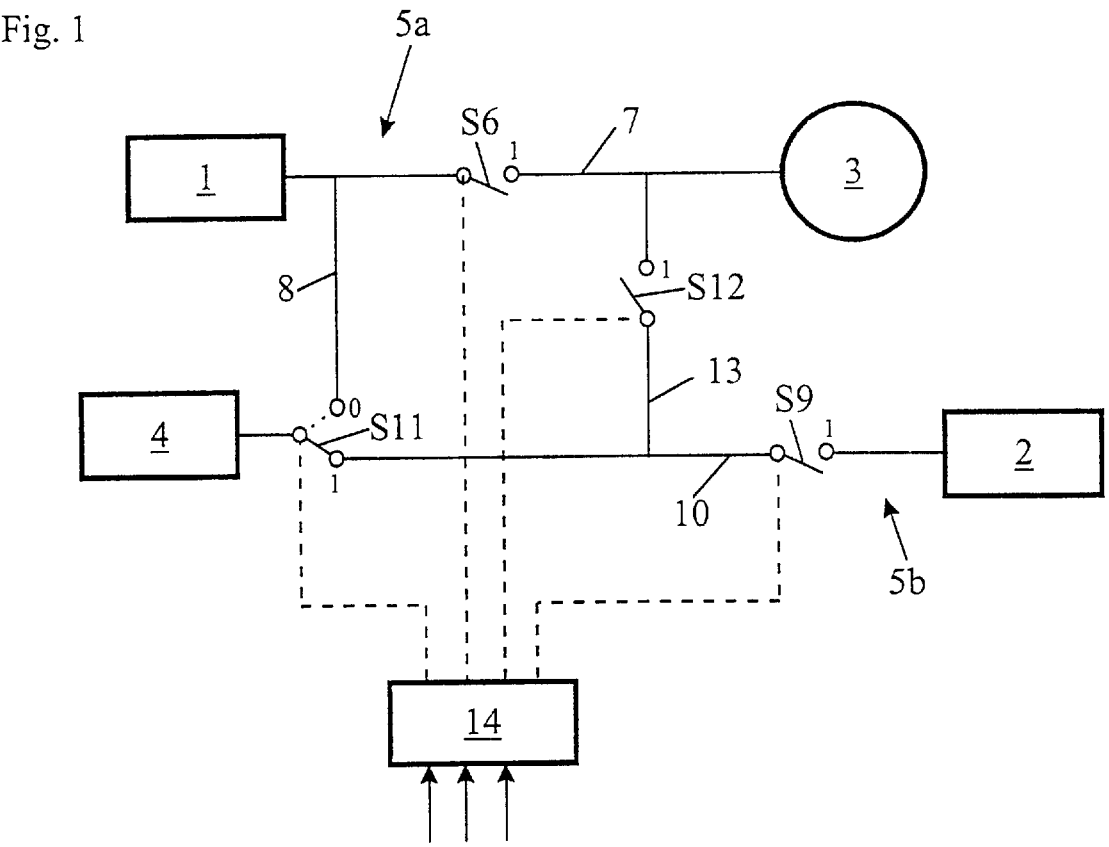
FIG. 1 shows a basic illustration of a hybrid drive having two circuits.

The hybrid drive shown in FIG. 1 contains a fuel cell 1, an energy store 2, an electric traction motor 3 and electrical auxiliary loads, denoted as a whole by 4. The fuel cell 1 is any desired device for producing electrical energy by chemical conversion of an arbitrary fuel. Such fuel cells for vehicle applications, for example fuel cells having a proton exchange membrane, are known to the expert and are therefore not explained in more detail below.

The energy store 2 is preferably a battery for storing electrical energy. However, other energy stores, for example capacitors or flywheel stores, can also be used. Any desired electric motors, for example asynchronous motors or reluctance motors, may be used as the electric traction motor 3. The electric traction motor 3 should preferably also be able to be operated as a generator. The term electrical auxiliary loads 4 covers all electrical loads, including a vehicle power supply, which are not used directly for driving the vehicle.

To supply the electrical loads 3, 4, two separate circuits 5a, 5b are provided. The first circuit 5a contains a line 7, provided with a switching device S6, between the fuel cell 1 and the electric traction motor 3, and also a line 8 which branches off from the line 7 between the fuel cell 1 and the switching device S6. The second circuit 5b contains a further line 10, which is provided with a switching device S9 and is connected to the energy store 2. The lines 8, 10 can be selectively connected to the electrical auxiliary loads 4 by means of a changeover device S11. In addition, the second circuit 5b contains a line 13 which is provided with a further switching device S12, branches off from the line 10 between the switching device S9 and the changeover device S11 and connects the second circuit 5b to the first circuit 5a between the switching device S6 and the electric traction motor 3.

To control the switching devices S6, S9, S11, S12, a control unit 14 is additionally provided which receives a multiplicity of information items about the operating state of the vehicle as input data. By way of example, this is information about the voltage or the load state of the fuel cell 1, the speed of the electric traction motor 3, the energy requirement of the electrical auxiliary loads 4, the voltage or the charge state of the energy store 2, a signal for detecting a braking operation, or the temperature of the fuel cell or energy store. The control unit 14 uses this, and possibly other, information to ascertain the operating state of the vehicle. A selection of possible operating states (FC=fuel cell 1, AL=auxiliary loads 4, store=energy store 2) with associated switch positions for the hybrid drive shown in FIG. 1 is shown in Table 1.

In driving mode, it is possible to distinguish between three states, where, for low and medium load, the electric traction motor 3 and the electrical auxiliary loads 4 are connected to the fuel cell 1 by means of the first circuit 5a. In this case (see state ①), the switching device S6 is closed, and the electrical auxiliary loads 4 are connected to the fuel cell 1 by means of the changeover device S11 and the line 8. The switching device S12 is open, which means that the electric traction motor 3, the fuel cell 1 and the electrical auxiliary loads 4 are isolated from the energy store 2. The position of the switching device S9 is arbitrary. The switching device S9 can additionally be used as a disconnecting switch in order to isolate the energy store 2 from the power supply in critical operating states.

TABLE 1

Possible states of the hybrid drive shown in FIG. 1

| State/switch position | S6 | S9 | S11 | S12 |
|---|---|---|---|---|
| ① Driving with FC, AL on FC | 1 | 0/1 | 0 | 0 |
| ② Driving with FC, AL on store | 1 | 1 | 1 | 0 |
| ③ Driving with store, AL on store | 0 | 1 | 1 | 1 |
| ④ Braking, AL on FC | 0 | 0/1 | 0 | 0 |
| ⑤ Braking, AL on FC, store charging | 0 | 1 | 0 | 1 |
| ⑥ Braking, AL on store, store charging | 0 | 1 | 1 | 1 |
| ⑦ Braking, AL on generator | 0 | 0 | 1 | 1 |
| ⑧ Standstill, AL on FC | 0 | 0/1 | 0 | 0 |
| ⑨ Standstill, AL on store | 0 | 1 | 1 | 0 |

At full load (see state ②), the switching device S6 is likewise closed, which means that the fuel cell 1 is connected to the electric traction motor 3 by means of the line 7. In contrast to the first case, the electrical auxiliary loads 4 are not connected to the fuel cell 1 by means of the line 8, however, but rather are connected to the energy store 2 by means of the changeover device S11, the line 10 and the closed switching device S9. The switching device S12 is open, which means that the circuits 5a, 5b are isolated from one another. This state has the advantage that the fuel cell 1 is not loaded with the electrical auxiliary loads 4. Instead, the whole fuel cell power is available for the electric traction motor 3. The supply of the electrical auxiliary loads 4 is undertaken by the energy store 2. Consequently, in this arrangement, the maximum driving power for a given fuel cell power is increased by the unneeded power of the electrical auxiliary loads 4.

A further possible driving state, for example when the vehicle is started or when there is a very low load, describes state ③. In this case, both the electric traction motor 3 and the electrical auxiliary loads 4 are supplied with voltage by the energy store 2. In contrast to state ②, only the switching device S6 is open in this case, and the switching device S12 is closed. This state is advantageous while the fuel cell 1 is not yet operational or else is turned off to improve efficiency.

In braking mode, it is possible to distinguish between four operating states. In order to be able to recover energy in braking mode, the electric traction motor 3 must also be able to be operated as a generator. In the text which follows, however, an electric traction motor/generator unit will also always be referred to only as an electric traction motor 3. In state ④, the electrical auxiliary loads 4 are connected to the fuel cell 1 by means of the changeover device S11. The switching devices S6 and S12 are open, and the position of the switching device S9 is arbitrary. In this state ④, the braking energy is not utilized. In order to charge the energy store 2 even at low brake powers, that is to say below the power requirement of the electrical auxiliary loads 4, it is possible to change to state ⑤. To this end, the switching devices S9 and S12 are closed, which means that, although the electrical auxiliary loads 4 are still connected to the fuel cell 1, the electric traction motor 3 is additionally connected to the energy store 2 by means of the second circuit 5b.

In state ⑥, preferably during a severe braking operation, the energy store 2 can be charged by the electric traction motor 3 via the second circuit 5b when the switching devices S9 and S12 are closed. At the same time, the electrical auxiliary loads 4 are connected to the electric traction motor 3 or to the energy store 2 by means of the changeover device S11. The switching device S6 is open, which means that the fuel cell 1 is completely decoupled from the second circuit 5b. In state ⑦, the switching devices S6 and S9 are finally open, which means that both the fuel cell 1 and the energy store 2 are decoupled from the power supply. The electrical auxiliary loads 4 are connected directly to the electric traction motor 3 by means of the changeover device S11 and the switching device S12.

When the vehicle is at a standstill, the electrical auxiliary loads 4 can finally be connected to the fuel cell 1 (state ⑧) or to the energy store 2 (state ⑨). In state ⑧, the fuel cell 1 is connected to the electrical auxiliary loads 4 by means of the changeover device S11 and the line 8. The switching devices S6 and S12 are open, and the position of the switching device S9 is arbitrary. If the fuel cell 1 is to be disconnected when the vehicle is at a standstill, then the electrical auxiliary loads 4 are connected to the energy store 2 by means of the changeover device S11, the line 10 and the switching device S9 (state ⑨). Since the fuel cell 1 and the electric traction motor 3 are not in operation, the switching devices S6 and S12 are preferably open.

As the present description reveals, the arrangement having two separate circuits 5a, 5b can produce variable switching states, with a suitable switch position enabling two independent circuits 5a, 5b having different voltage levels to be operated at the same time. In this arrangement, the fuel cell 1 can be connected to the electric traction motor 3 and/or to the electrical auxiliary loads 4 in each case. The same applies to the energy store 2. In addition, it is also possible for the fuel cell 1 and the energy store 2 to be connected to one another, for example for a charging operation.

Figure 2:
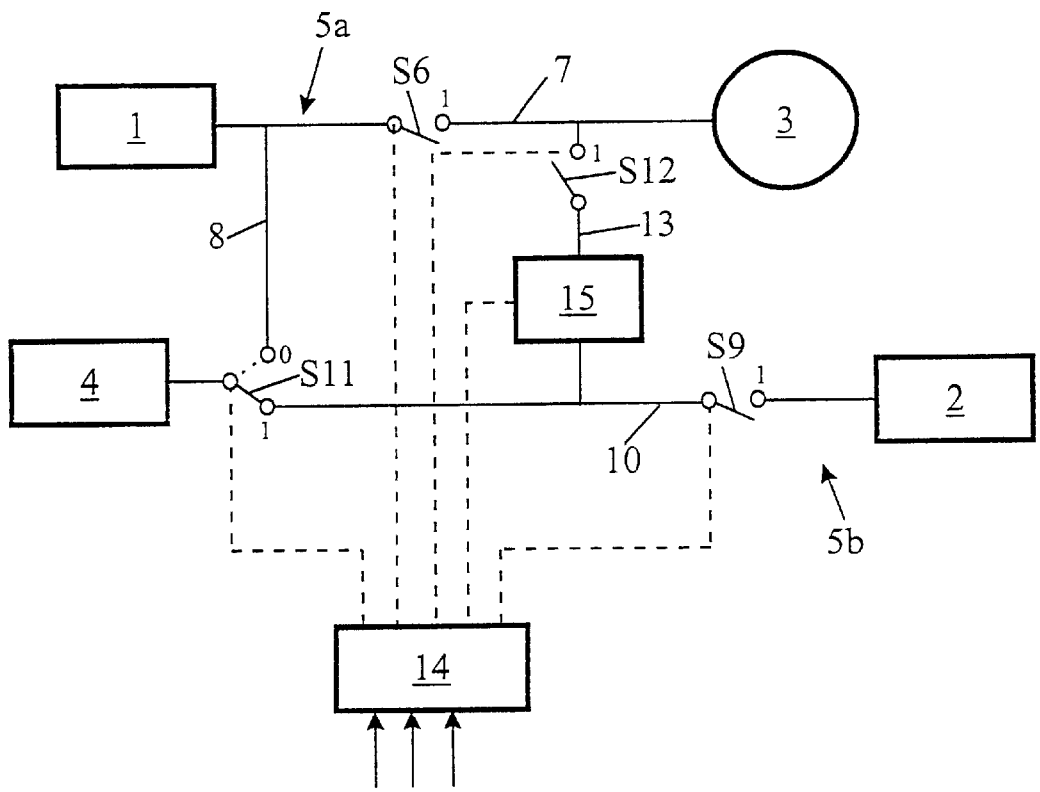
FIG. 2 shows the hybrid drive from FIG. 1 with a DC/DC converter between the fuel cell and the energy store.

FIG. 2 shows a modification of the hybrid drive shown in FIG. 1, with identical parts being identified by identical reference symbols. In comparison with FIG. 1, a DC/DC converter 15 is additionally provided in the line 13. The use of such a DC/DC converter 15 has the advantage that it is possible to charge and discharge the energy store 2 (state ②a or ③a, see below) irrespective of the voltage and of the load state of the fuel cell 1, because the voltages of the two circuits 5a, 5b can be tuned to one another by the DC/DC converter 15. Thus, it is also possible to charge the energy store 2 via the fuel cell 1 when the vehicle is at a standstill (state ⑧a, see below)

TABLE 2

Possible states of the hybrid drive shown in FIG. 2

| State/switch position | S6 | S9 | S11 | S12 |
|---|---|---|---|---|
| ① Driving with FC, AL on FC | 1 | 0/1 | 0 | 0 |
| ② Driving with FC, AL on store | 1 | 1 | 1 | 0 |
| ②a Driving with FC, store charging | 1 | 1 | 0/1 | 1 |
| ③ Driving with store, AL on store | 0 | 1 | 1 | 1 |
| ③a Driving with FC and store | 1 | 1 | 0/1 | 1 |
| ④ Braking, AL on FC | 0 | 0/1 | 0 | 0 |
| ⑤ Braking, AL on FC, store charging | 0 | 1 | 0 | 1 |
| ⑥ Braking, AL on store, store charging | 0 | 1 | 1 | 1 |
| ⑦ Braking, AL on generator | 0 | 0 | 1 | 1 |
| ⑧ Standstill, AL on FC | 0 | 0/1 | 0 | 0 |
| ⑧a Standstill, AL on FC, store charging | 1 | 1 | 0 | 1 |
| ⑨ Standstill, AL on store | 0 | 1 | 1 | 0 |

The use of a DC/DC converter 15 naturally means a loss of efficiency. However, since the DC/DC converter 15 is arranged between the fuel cell 1 and the energy store 2, but not between the fuel cell 1 and the electric traction motor 3, these converter losses arise only when the energy store 2 is being charged, but not during driving with the fuel cell 1. The great advantage of this arrangement, however, is that, in any load state, the individual load can be regulated by the fuel cell 1 and by the energy store 2 independently of one another within the physical limits. In addition, at full load, the maximum driving power is calculated from the sum of the powers of the fuel cell 1 and the energy store 2. In this state ③a, the switching devices S6, S9 and S12 are closed, which means that both the fuel cell 1 and the energy store 2 are connected to the electric traction motor 3. The position of the changeover device S11 is arbitrary. Using the DC/DC converter 15, the voltage of the second circuit 5b can be matched to the voltage of the first circuit 5a, which means that the different voltage levels of the fuel cell 1 and the energy store 2 do not present a problem.

In state ②a, the switching devices S6, S9 and S12 are likewise closed, which means that both the electric traction motor 3 and the energy store 2 are connected to the fuel cell 1. The position of the changeover device S11 is again arbitrary. However, the DC/DC converter 15 is now operated such that current does not flow from the energy store 2 to the electric traction motor 3, but rather from the fuel cell 1 to the energy store 2. In addition, these switch positions correspond exactly to state ⑧a while the vehicle is at a standstill. The switching device S12 is not absolutely necessary in this arrangement and may even be omitted if appropriate.

Figure 3:
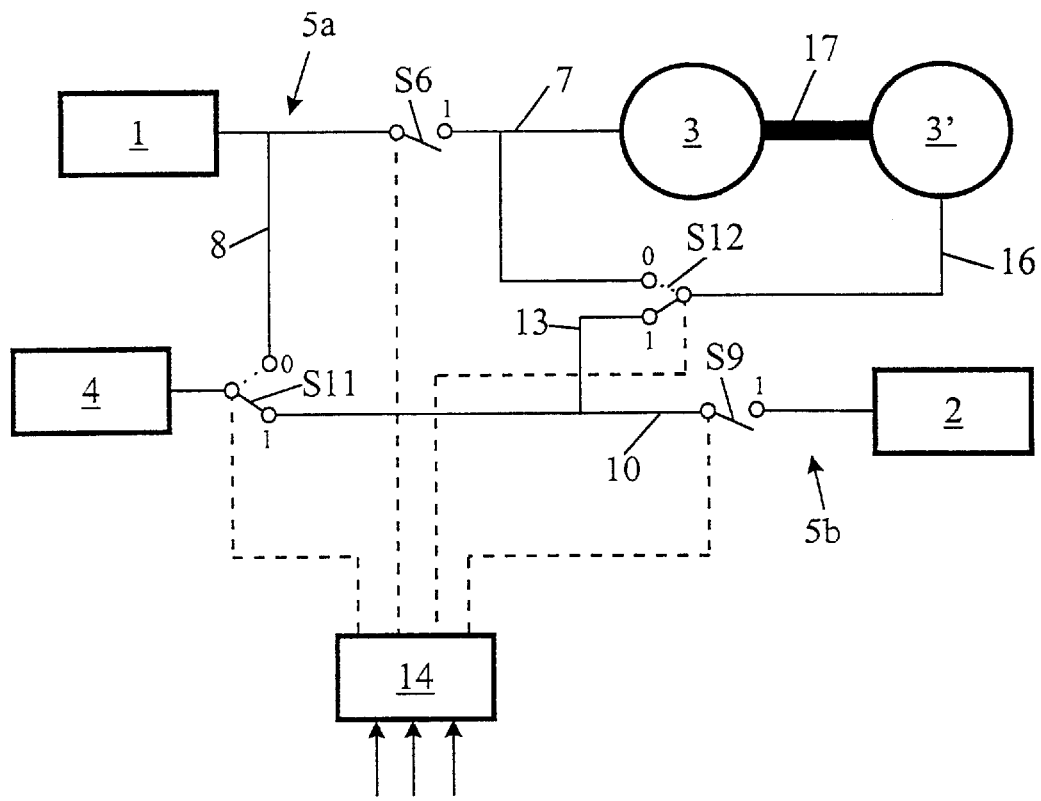
FIG. 3 shows the hybrid drive from FIG. 1 with a second electric traction motor.

FIG. 3 shows a further illustrative embodiment of a hybrid drive, with identical parts again being identified by identical reference symbols.

In this illustrative embodiment, the vehicle drive comprises two electric traction motors 3, 3'. In the drawing, these are arranged on a common drive shaft 17 and may, if appropriate, also be integrated in a common housing. However, it is also possible for two or more electric traction motors 3, 3' to be provided with respectively separate drive shafts 17. Irrespective of this, identical or different electric machines, for example reluctance motors or asynchronous motors, may be combined. The electric traction motors 3, 3' are controlled on a load-dependent basis. For low moments, preferably up to 50% of the maximum moment, driving is effected using only one of the electric traction motors 3, 3'. The other electric traction motor 3, 3', respectively, runs constantly at the same time without any load. For higher moments, both electric traction motors 3, 3' are used, with the moment being able to be distributed over the two electric traction motors 3, 3', for example by means of the control unit 14.

TABLE 3

Possible states of the hybrid drive shown in FIG. 3

| State/switch position | S6 | S9 | S11 | S12 |
|---|---|---|---|---|
| ① Driving with FC, AL on FC | 1 | 0/1 | 0 | 0 |
| ② Driving with FC, AL on store | 1 | 1 | 1 | 0 |
| ②a Driving with FC, store charging | 1 | 1 | 0/1 | 1 |
| ③ Driving with store, AL on store | 0 | 1 | 1 | 1 |
| ③a Driving with FC and store | 1 | 1 | 0/1 | 1 |
| ④ Braking, AL on FC | 0 | 0/1 | 0 | 0 |
| ⑤ Braking, AL on FC, store charging | 0 | 1 | 0 | 1 |
| ⑥ Braking, AL on store, store charging | 0 | 1 | 1 | 1 |
| ⑦ Braking, AL on generator | 0 | 0 | 1 | 1 |
| ⑧ Standstill, AL on FC | 0 | 0/1 | 0 | 0 |
| ⑨ Standstill, AL on store | 0 | 1 | 1 | 0 |

Unlike in FIGS. 1 and 2, the switching device S12 is not in the form of an on/off switch, but rather is in the form of a changeover device. In addition, a further line 16 is provided between the changeover device S12 and the second electric traction motor 3'. The second electric traction motor 3' can be selectively connected to the energy store 2 or to the fuel cell 1 by means of the changeover device S12. This means that, at full load, the first electric traction motor 3 can be connected to the fuel cell 1 while the second electric traction motor 3' can be connected to the energy store 2. Consequently, the maximum driving power available is again the sum of the powers of the fuel cell 1 and the energy store 2. In contrast to FIG. 2, however, in this case it is not necessary to accept the converter losses when the energy store 2 is being charged. In this regard (state M②a), while the vehicle is in motion, the first electric traction motor 3 is driven using the fuel cell 1 while the second electric traction motor 3' charges the energy store 2 in generator mode. However, this arrangement without coupling in the drive train cannot be used to charge the energy store 2 when the vehicle is at a standstill (state ⑧a in Table 2).

Figure 4:
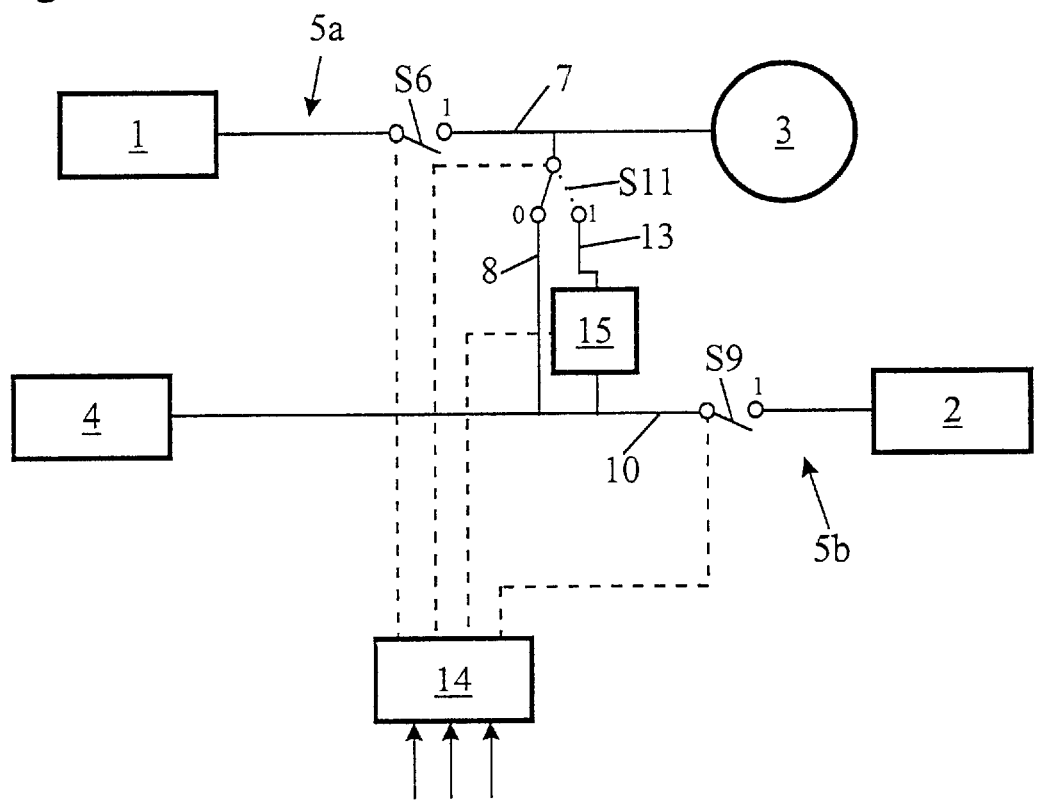
FIG. 4 shows a basic illustration of a further hybrid drive having a DC/DC converter.

FIG. 4 shows a further illustrative embodiment of a hybrid drive having a DC/DC converter, with identical parts again being identified by identical reference symbols. The fuel cell 1 is again connected to the electric traction motor 3 by means of a line 7 provided with a switching device S6. In addition, the energy store 2 is connected to the electrical auxiliary loads 4 by means of a line 10 provided with a switching device S9. Furthermore, two lines 8, 13 branch off from the line 10 between the switching device S9 and the electrical auxiliary loads 4, said lines 8, 13 being selectively connectable to the line 7 between the switching device S6 and the electric traction motor 3 by means of a changeover device S11. A DC/DC converter 15 is additionally provided in the line 13.

TABLE 4

Possible states of the hybrid drive shown in FIG. 4

| State/switch position | S6 | S9 | S11 |
|---|---|---|---|
| ① Driving with FC, AL on FC | 1 | 0 | 0 |
| ② Driving with FC, AL on store | 1 | 1 | 1 |
| ②a Driving with FC, store charging | 1 | 1 | 1 |
| ③ Driving with store, AL on store | 0 | 1 | 1 |
| ③a Driving with FC and store | 1 | 1 | 1 |
| ④ Braking, AL on FC | 1 | 0 | 0 |
| ⑤ Braking, AL on FC, store charging | 1 | 1 | 1 |
| ⑥ Braking, AL on store, store charging | 0 | 1 | 0 |

TABLE 4-continued

Possible states of the hybrid drive shown in FIG. 4

| State/switch position | | S6 | S9 | S11 |
|---|---|---|---|---|
| ⑦ | Braking, AL on generator | 0 | 0 | 0 |
| ⑧ | Standstill, AL on FC | 1 | 0 | 0 |
| ⑧a | Standstill, AL on FC, store charging | 1 | 1 | 1 |
| ⑨ | Standstill, AL on store | 0 | 1 | 0 |

In driving mode, a plurality of switching states are again provided. In state ①, the switching device S9 is open, which means that the energy store is decoupled from the circuits 5a, 5b. The switching device S6 is closed, which means that the electric traction motor 3 is driven using the fuel cell 1. The electrical auxiliary loads 4 are also supplied by the fuel cell 1, with the changeover device S11 preferably being in position 0, that is to say without the DC/DC converter 15 interposed. This enables unnecessary converter losses to be avoided.

In state ③, the switching device S6 is open, which means that the fuel cell 1 is decoupled from the circuits 5a, 5b. The switching device S9 is closed, which means that the electric traction motor 3 is driven using the energy store 2. The electrical auxiliary loads 4 are also supplied by the energy store 2. The changeover device S11 is preferably in position 1, which means that the DC/DC converter 15 can be used to set the voltage required for the electric traction motor 3 irrespective of the voltage of the energy store 2. In the other driving states ②, ②a, ③a, the switching devices S6 and S9 are closed in each case, which means that both the fuel cell 1 and the energy store 2 are connected to the circuits 5a, 5b. The changeover device S11 is in position 1, which means that the two circuits 5a, 5b are connected by means of the line 13 and the DC/DC converter 15 arranged therein. Control of the DC/DC converter 15, which, as in the other illustrative embodiments, is also preferably carried out by the control unit 14, governs whether the energy store 2 is charged by the fuel cell 1 when the vehicle is in motion (state ②a), whether the electric traction motor 3 or the electrical auxiliary loads 4 are supplied by the fuel cell 1 or by the energy store 2 (state ②), or whether, at full load, the electric traction motor 3 is supplied both by the fuel cell 1 and by the energy store 2 (state ③a), and consequently the maximum driving power is again determined by the sum of the energy contents of the fuel cell 1 and the energy store 2. In addition, the DC/DC converter 15 again enables the energy store 2 to be charged/discharged when the vehicle is in motion irrespective of the voltage or of the load state of the fuel cell 1.

During braking, the electrical auxiliary loads 4 can be supplied by the fuel cell 1 (state ④), in which case the switching device S6 is then closed and the switching device S9 is open. The changeover device S11 is in position 0, which means that the DC/DC converter 15 is decoupled. If, in addition, the energy store is to be charged (state ⑤), the changeover device S11 is switched to position 1 and the switching device S9 is closed. The DC/DC converter 15 which is now interposed enables the voltage to be set to the level required for a charging operation.

By opening the switching device S6, the fuel cell 1 can be decoupled. At the same time, the switching device S9 is then closed and the changeover device S11 is switched to position 0, which means that the DC/DC converter 15 is also decoupled. In this state ⑥, the electrical auxiliary loads 4 are supplied by the energy store 2. At the same time, the energy store 2 can be charged without converter losses. In state ⑦, the switching devices S6 and S9 are finally open, which means that both the fuel cell 1 and the energy store 2 are decoupled from the circuits 5a, 5b. The changeover device S11 is in position 0, which means that the electrical auxiliary loads 4 are supplied with current directly from the electric traction motor 3 without interposition of the DC/DC converter 15.

When the vehicle is at a standstill, the electrical auxiliary loads 4 can finally be supplied either by the fuel cell 1 (state ⑧) or by the energy store 2 (state ⑨), in which case either the switching device S6 (state ⑧) or the switching device S9 (state ⑨) is closed. The changeover device S11 is again in position 0, which means that the DC/DC converter 15 is decoupled. If, when the vehicle is at a standstill, the energy store 2 is additionally to be charged (state ⑧a), the switching devices S6, S9 are closed and the changeover device S11 is additionally switched to position 1. This means that the energy store 2 is again connected to the fuel cell 1 by means of the DC/DC converter 15, so that controlling the DC/DC converter 15 enables the voltage to be set to a level which is required for the charging operation.

The switching states described using the illustrative embodiments and tables do not represent any conclusive listing. Other switching states are also possible.

The foregoing description constitutes the preferred embodiments devised by inventors for practicing the invention. It is apparent, however, that the invention is susceptible to modification, variation and change that will be obvious to those skilled in the art. Inasmuch as the foregoing description is intended to enable one skilled in the pertinent art to practice the invention, it should not be construed to be limited thereby but should be construed to include such aforementioned obvious variations and be limited only by the proper scope or fair meaning of the accompanying claims.

What is claimed is:

1. A hybrid drive system for a motor vehicle comprising:
   a fuel cell;
   an energy store;
   a first electric traction motor,
   an auxiliary electrical load;
   a first circuit operable at a first voltage and adapted to selectively supply said first traction motor and said auxiliary electrical load with electrical energy, said first circuit includes a first switching device for selectively connecting said fuel cell and said first traction motor, said first circuit also includes a second switching device for selectively connecting said fuel cell to said auxiliary electrical load; said first circuit capable of connecting said fuel cell, said first traction motor, and said auxiliary electrical load,
   a second circuit operable at a second voltage and adapted to selectively supply said first traction motor and said auxiliary electrical load with electrical energy, said second circuit includes a third switching device for selectively connecting said energy store and said first traction motor, said second circuit also includes a fourth switching device for selectively connecting said energy store to said auxiliary electrical load; said second circuit capable of connecting said energy store, said first traction, motor, and said auxiliary electrical load; and
   a device for controlling said first, second, third, and fourth switching devices.

2. The invention as set forth in claim 1, wherein said first voltage can differ from said second voltage.

3. The invention as set forth in claim 1, wherein said second and fourth switching devices are a single changeover device.

4. The invention as set forth in claim 2, wherein said first circuit includes a first line disposed between said fuel cell and said first traction motor and a second line disposed between said fuel cell and said auxiliary electrical load, wherein said first switching device is disposed in said first line, said second line branches off from said first line between said fuel cell and said first switching device.

5. The invention as set forth in claim 4, wherein said second circuit includes a third line disposed between said energy store and said first traction motor, said second circuit also includes a fourth line disposed between said energy store and said auxiliary electrical loads, said third switching device is disposed in said third line, said fourth line includes a fifth switching device, said third line connects said second circuit to said first circuit and branches off from said fourth line between said auxiliary electrical loads and said fifth switching device.

6. The invention as set forth in claim 5, wherein said second and fourth switching devices are a single changeover device such that said auxiliary electrical loads can be selectively connected to said second line or said fourth line.

7. The invention as set forth in claim 6, further comprising a DC/DC converter disposed between said third switching device and said energy store.

8. The invention as set forth in claim 6, further comprising a second traction motor and a fifth line disposed between said second traction and said third switching device, said third switching device being a changeover switch such that said second traction motor can be selectively connected to said first circuit or said second circuit.

9. The invention as set forth in claim 2, wherein said first circuit includes a first line and a second line, said first switching device being disposed in said first line between said fuel cell and said first traction motor, said second circuit includes a fourth line having a fifth switching device disposed therein between said energy store and said auxiliary electrical loads, a third line branches of from said fourth line between said fifth switching device and said auxiliary electrical loads, said first line being capable of being selectively connected to said second line or to said third line.

10. The invention as set forth in claim 1, wherein said energy store is a battery.

11. The invention as set forth in claim 1, wherein said first traction motor can be operated as a generator.

12. The invention as set forth in claim 8, wherein said second traction motor can be operated as a generator.

13. A method for operating a hybrid drive system for a motor vehicle comprising:

providing a fuel cell;

providing an energy store;

providing an electric traction motor;

providing an auxiliary electrical load;

providing a circuit having a plurality of switches selectively interconnecting said fuel cell, said energy store, said traction motor, and said auxiliary electrical load;

powering said traction motor with said fuel cell and separately powering said auxiliary electrical loads while in a first load driving state;

powering said traction motor and said auxiliary loads with said fuel cell while in a second load driving state;

powering said traction motor and said auxiliary loads with said energy store at a third load driving state; wherein said first load is greater than said second load and said second load is greater than said third load.

14. The invention as set forth in claim 13, further comprising:

powering said auxiliary loads by said fuel cell while in a first standstill state;

powering said auxiliary loads by said energy store in said second standstill position while said fuel cell is disabled.

15. The invention as set forth in claim 13, wherein said traction motor can also act as a generator.

16. The invention as set forth in claim 15, further comprising charging said energy store with said traction motor while in a braking state.

17. The invention as set forth in claim 15, further comprising:

powering said auxiliary electrical loads with said fuel cell and charging said energy store with said traction motor while in a first braking mode;

powering said auxiliary electrical loads with said energy store and charging said energy store with said traction motor while in a second braking mode, said second braking mode being more severe than said first braking mode.

18. The invention as set forth in claim 17, wherein said second braking mode providing a greater deceleration of said vehicle than said first braking mode.

19. The invention as set forth in claim 17, further comprising powering said auxiliary electrical loads with said generator in a third braking state.

20. The invention as set forth in claim 13, further comprising operating said fuel cell at a first voltage and operating said energy store at a second voltage.

21. The invention as set forth in claim 20 wherein said first voltage can be different from said second voltage.

22. The invention as set forth in claim 21, further comprising providing a DC/DC converter and charging said energy store and powering said traction motor with said fuel cell while said vehicle is in a fourth driving state.

* * * * *